Sept. 14, 1965  E. J. KNAPTON  3,205,609
LURE HAVING A DETACHABLE ACTION WEIGHT
Filed April 28, 1964
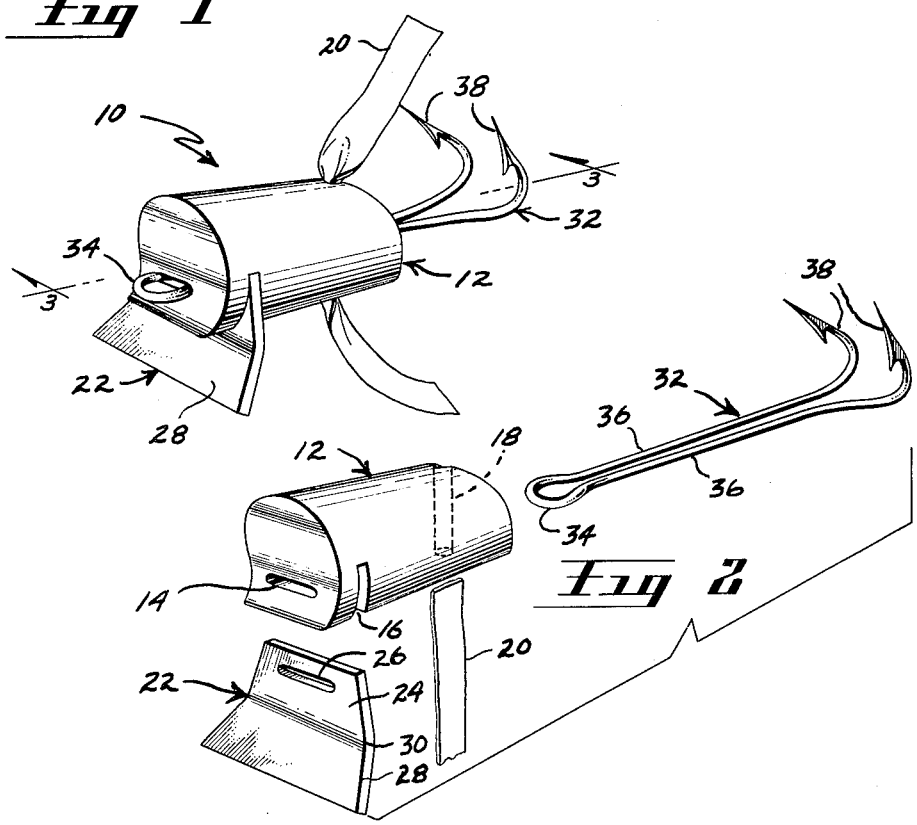
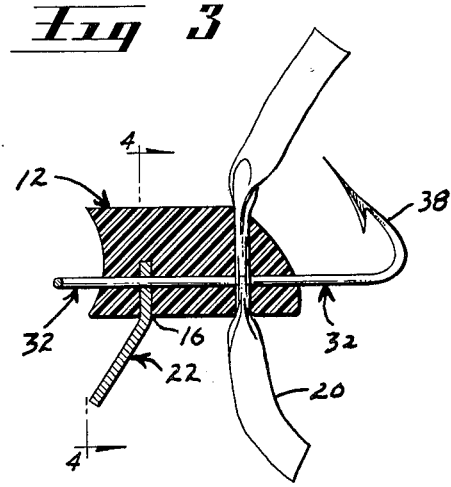
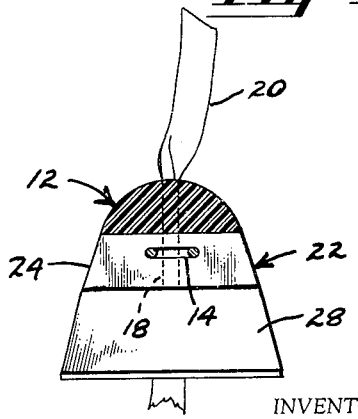
INVENTOR.
EARL J. KNAPTON
BY
Meyers & Peterson
ATTORNEYS

United States Patent Office 3,205,609
Patented Sept. 14, 1965

3,205,609
LURE HAVING A DETACHABLE ACTION WEIGHT
Earl J. Knapton, 508 S. 2nd St., Bemidji, Minn.
Filed Apr. 28, 1964, Ser. No. 363,077
7 Claims. (Cl. 43—42.09)

This invention relates generally to fish lures, and pertains more particularly to a lure having a detachable weight by reason of which the action of the lure in the water may be modified.

Weights have been utilized in conjunction with fish lures in order to vary their movement in the water and also to determine the depth at which the lure travels. However, the lures of this character with which I am familiar are relatively complex and costly. Accordingly, the present invention has for an object the provision of a lure in which the weight can be readily changed as circumstances dictate. Also, the invention has for an aim, the use of a weight that will provide a life-like movement as the lure is pulled through the water. Further, the invention has for an object the facile changing of one weight or mass to another. Still further, the invention has for an object the provision of a lure constructed of only a few parts and which parts can be fabricated quite inexpensively.

These and other objects and advantages of my invention will more fully appear from the following description, made in connection with the accompanying drawing, wherein like reference characters refer to the same or similar parts throughout the several views and in which:

FIGURE 1 is a perspective view of one form my fish lure can assume;

FIGURE 2 is a perspective view corresponding generally to FIGURE 1, but with the parts arranged in an exploded or detached fashion;

FIGURE 3 is a sectional view taken along the line 3—3 of FIGURE 1; and

FIGURE 4 is a sectional view taken in the line 4—4 of FIGURE 3.

Referring now in detail to the drawing, my fish lure has been denoted in its entirety by the reference numeral 10. The lure 10 comprises a body 12 which can be made from plastic or wood. The body 12 is formed with a longitudinal passage or slot 14 extending completely through the entire length of the body. A transverse slot 16 extends upwardly from the bottom of the body 12 to a distance somewhat above the longitudinal slot 14. Stated somewhat differently, the transverse slot 16 intersects the longitudinal slot 14, doing so in a manner so that a portion of the slot 16 extends above the slot 14. This relationship is clearly depicted in FIGURE 3.

The body 12 also has a vertical passage or opening 18 that extends from the top to the bottom. The purpose of the passage 18 is to accommodate a flexible or resilient tail piece 20 in the form of a rubber strip or the like. It will be appreciated that the strip 20 may be vividly colored so as to assist in attracting a fish to the lure. Also, it is planned that additional passages 18 be employed if deemed necessary; for instance, a laterally extending passage could be drilled either for or aft of the passage 18 and a second strip 20 be held therein.

It will be observed that the transverse slot 16 is located forwardly of the center of gravity of the body 12. By so locating the slot 16, it is possible to achieve a greater variation in the movement of the lure 10, particularly with respect to having the lure traverse a somewhat undulated path as it advances through the water, thereby simulating more accurately the actual movement of a live fish.

To cause such a simulated movement, the invention includes a plate member 22 having an upper section 24 that is received or accommodated in the slot 16. As best shown in FIGURE 2, the upper section 24 is formed with a laterally extending aperture 26 having a width and height commensurate with the longitudinal slot 14. The lower section of the member 22 has been labeled 28 and as best seen in FIGURE 3, it will be discerned that the section 28 projects downwardly and forwardly to provide a scooping action as the lure 10 is pulled through the water, being bent somewhat along a line at 30. Although not pictured, it is planned that the plate member will at times be reversed so that the section 28 projects downwardly and rearwardly, thereby producing a gliding-type action as the lure advances through the water. It is important to appreciate that the mass of the plate member 22 can be varied by utilizing a plurality of such members, it being contemplated that the various members be supplied in the form of a kit at the time the lure is purchased.

Owing to the spacing of the aperture 26 somewhat below the upper edge of the plate member 22, more particularly a distance corresponding to the distance the transverse slot 16 extends above the longitudinal slot 14, when the upper section 24 is placed in the slot 16, then the aperture 26 will be in registry with the slot 14.

The invention envisages the utilization of a fish hook 32 for the purpose of retaining the plate member 22 in a fixed relationship with the lure body 12. The fish hook 32 comprises an eye portion 34 having integral shank portions 36 connected thereto. Each of the shank portions 36 carries at its opposite end a hook 38. The dimensions of the slot 14 and the aperture 26 are designed in conjunction with the width and height of the eye portion 34.

From the foregoing information, the manner in which my fish lure 10 is assembled should be readily understood. With the upper section 24 of the plate member 22 positioned in the transverse slot 16 so as to produce alignment between its aperture 26 and the slot 16, the user then proceeds to insert the eye portion 34 of the fish hook 32 through the rear end of the slot 14. This is easily achieved by merely grasping the shank portions 36 and forcing the eye portion 34 into the rear end of the slot 14. As the eye portion 34 is advanced toward the forward end of the slot 14, it passes through the aperture 26 and when the eye portion 34 emerges from the forward end of the slot 14, it assumes the relationship pictured in FIGURE 1. The user can then release his grasp on the shank portions 36 and the hooks 38 are free to diverge apart due to the inherent resiliency of the shank portions 36. The tail piece 20 can then be pulled through the passage 18 by bending it upon itself to form a loop, a suitable thread or filament, such as a semi-stiff leader, being utilized in doing this. Having performed the above steps, a fish line can then be connected to the projecting eye portion 34.

Whenever it is desired to change the plate member 22 so as to realize a different action, either to modify the movement of the fish lure 10 or to determine the depth at which it travels, a reverse procedure can be followed to the extent of pulling the fish hook 32 rearwardly until the eye portion 34 is located just rearwardly of the slot 16. Another plate member 22 can then be inserted upwardly into the transverse slot 16 and then the fish hook 32 can be moved forwardly so as to have the eye portion 34 pass through the aperture 26 of the different member 22. This same procedure would also be followed when reversing the plate member as previously mentioned.

It has not been thought necessary to show more than one plate member 22, but it will be appreciated that a number of such members can be provided. The downwardly projecting section 28 serves as a vane and the surface afforded, whether inclining forwardly or rearwardly, will determine how the lure 10 will function as it is pulled through the water. Also, the amount of mass incorporated into the plate member 22 will influence the distance that the lure can be cast. Consequently, it will be appreciated that my invention involves the use of only a few parts and that these parts can be varied, particularly the plate member 22, so as to obtain a variety of different actions.

It will, of course, be understood that various changes may be made in the form, details, arrangements and proportions of the parts without departing from the scope of my invention as set forth in the appended claims.

What is claimed is:
1. A fish lure comprising:
  (a) an elongated body having a longitudinal slot extending therethrough and a transverse slot intersecting said longitudinal slot and extending through the bottom of the body;
  (b) said transverse slot extending past said longitudinal slot;
  (c) a fish hook having a hook portion, an eye portion, and an intermediate shank portion;
  (d) said shank portion being received in said longitudinal slot, and
  (e) a detachable plate member extending through and having a section thereof received in said transverse slot,
  (f) said section having an aperture therein through which said shank portion passes in order to retain said section in said transverse slot.
2. A fish lure in accordance with claim 1 in which:
  (a) said plate member has a section projecting from and which is angled with respect to said received section.
3. A fish lure comprising:
  (a) an elongated body formed with a longitudinal slot extending completely therethrough and also formed with a transverse slot extending upwardly through the bottom of the body to a locus above said longitudinal slot;
  (b) a first hook having a hook, an eye portion and an intermediate shank portion;
  (c) said longitudinal slot having a width and height sufficient to allow said eye portion to be inserted therethrough in order to have said shank portion received therein, and
  (d) a detachable plate having an aperture therein corresponding in width and height to the said longitudinal slot;
  (e) said aperture being spaced from the upper edge of said plate a distance equal to the distance said transverse slot extends above said longitudinal slot so as to allow registry of said aperture with said longitudinal slot in order to permit passage of said eye portion through said aperture.
4. A fish lure in accordance with claim 3 in which:
  (a) said plate has an angular portion projecting downwardly from the bottom of said body.
5. A fish lure in accordance with claim 3 in which:
  (a) said fish hook has two shank portions integral with said eye portion and a hook portion at the end of each of said portions.
6. A fish lure in accordance with claim 3 in which:
  (a) said transverse slot is located forwardly of the center of gravity of said body.
7. A fish lure comprising:
  (a) an elongated body formed with a longitudinal slot extending completely therethrough and also formed with a transverse slot extending upwardly through the bottom of the body to a locus above said longitudinal slot;
  (b) a first hook having a hook, an eye portion and an intermediate shank portion;
  (c) said longitudinal slot having a width and height sufficient to allow said eye portion to be inserted therethrough in order to have said shank portion received therein, and
  (d) a detachable plate having an aperture therein corresponding in width and height to the said longitudinal slot;
  (e) said aperture being spaced from the upper edge of said plate a distance equal to the distance said transverse slot extends above said longitudinal slot so as to allow registry of said aperture with said longitudinal slot in order to permit passage of said eye portion through said aperture,
  (f) said plate having an angular portion projecting downwardly from the bottom of said body and extending either forwardly or rearwardly depending upon the manner said plate is inserted in said transverse slot.

References Cited by the Examiner
UNITED STATES PATENTS
2,596,201  5/52  Bocchino _____ 43—42.39 X
2,765,569  10/56  Claybrook _____ 43—42.38 X FOREIGN PATENTS
906,089  9/62  Great Britain.

SAMUEL KOREN, *Primary Examiner.*
ABRAHAM G. STONE, *Examiner.*